United States Patent [19]

Kubota

[11] 4,044,995

[45] Aug. 30, 1977

[54] VALVE

[75] Inventor: Yasuna Kubota, Kunitachi, Japan

[73] Assignee: Taimei Kinzoku Kabushiki Kaisha, Tokyo, Japan

[21] Appl. No.: 707,403

[22] Filed: July 21, 1976

[51] Int. Cl.² ............................................. F16K 25/00
[52] U.S. Cl. .................................... 251/188; 251/161; 251/310
[58] Field of Search ......................... 251/161, 188, 310

[56] References Cited

U.S. PATENT DOCUMENTS

| 69,859 | 10/1867 | Stokes | 251/188 |
| 868,143 | 10/1907 | Strang | 251/188 |
| 1,186,593 | 6/1916 | Meyer | 251/188 |
| 3,398,763 | 8/1968 | Richards | 251/188 X |

Primary Examiner—Harold W. Weakley
Attorney, Agent, or Firm—Frank J. Jordan

[57] ABSTRACT

An angle ball valve which can compensate the wear of the seat ring by a simple operation such that the adjusting spindle is merely rotated without decomposing the valve.

1 Claim, 4 Drawing Figures

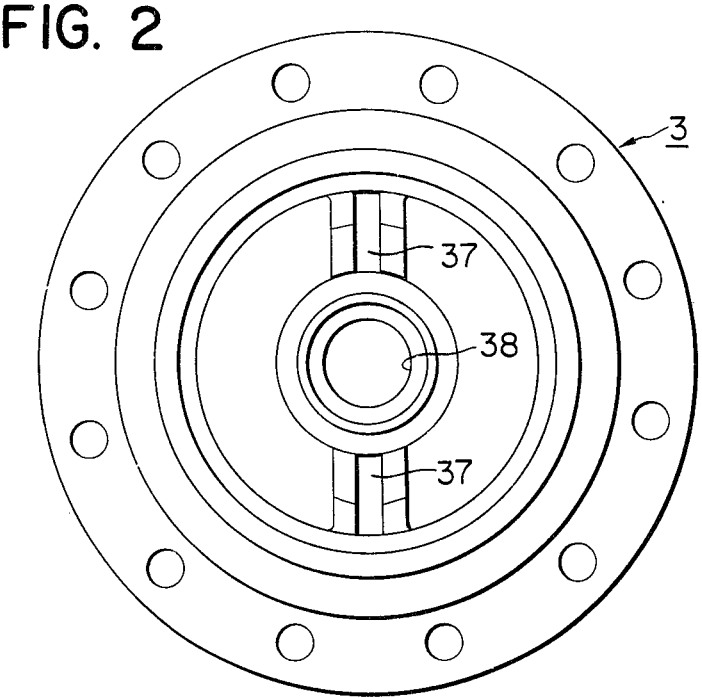
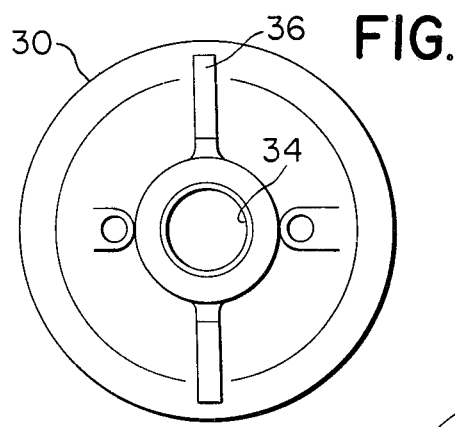
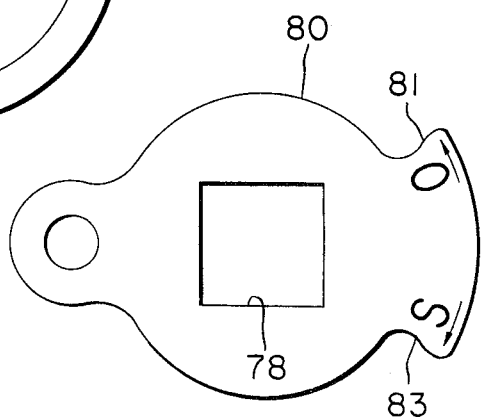

VALVE

BACKGROUND OF THE INVENTION

In the conventional angle ball valve, the seat ring is worn uniformly for the reason that the fluid which enters from the first flow passage through the inlet port of the valve member into the valve member causes an irregular flow and the direction of the fluid flow is changed into that of the second flow passage through the outlet port of the valve member, when a partial load is caused in the valve member, and accordingly applied directly to the seat ring which supports the valve member. The thus worn seat ring cannot support the valve member in the normal posture, as the valve member is leaned. Consequently, it becomes difficult to rotate the valve member smoothly by means of a valve stem, and then a clearance is produced between the valve member and the deformed seat ring and brings the leakage of fluid.

This invention relates to an angle ball valve adapted to support a partial load by a receiving member in order that a partial load may not be applied to a seat ring which supports a valve member, and said angle ball valve which can compensate the wear of the seat ring by a simple operation such that the adjusting spindle is merely rotated without decomposing the valve.

SUMMARY OF THE INVENTION

One object of this invention is to provide an angle ball valve in which a partial load is not applied to the seat ring.

Another object of this invention is to provide an angle ball valve in which a partial load is supported by contacting the contacting surface of the valve member and the receiving surface of the receiving member.

Further object of this invention is to provide an angle ball valve which can compensate the wear of the seat ring by a simple operation such that the adjusting spindle is merely rotated without decomposing the valve.

BRIED DESCRIPTION OF THE DRAWINGS

FIG. 2 is an inside end view of the cover member;

FIG. 3 is an outside end view of the seat holder; and

FIG. 4 is a plan view of the stopping means of the valve member.

DETAILED DESCRIPTION OF THE INVENTION

Figure 1:
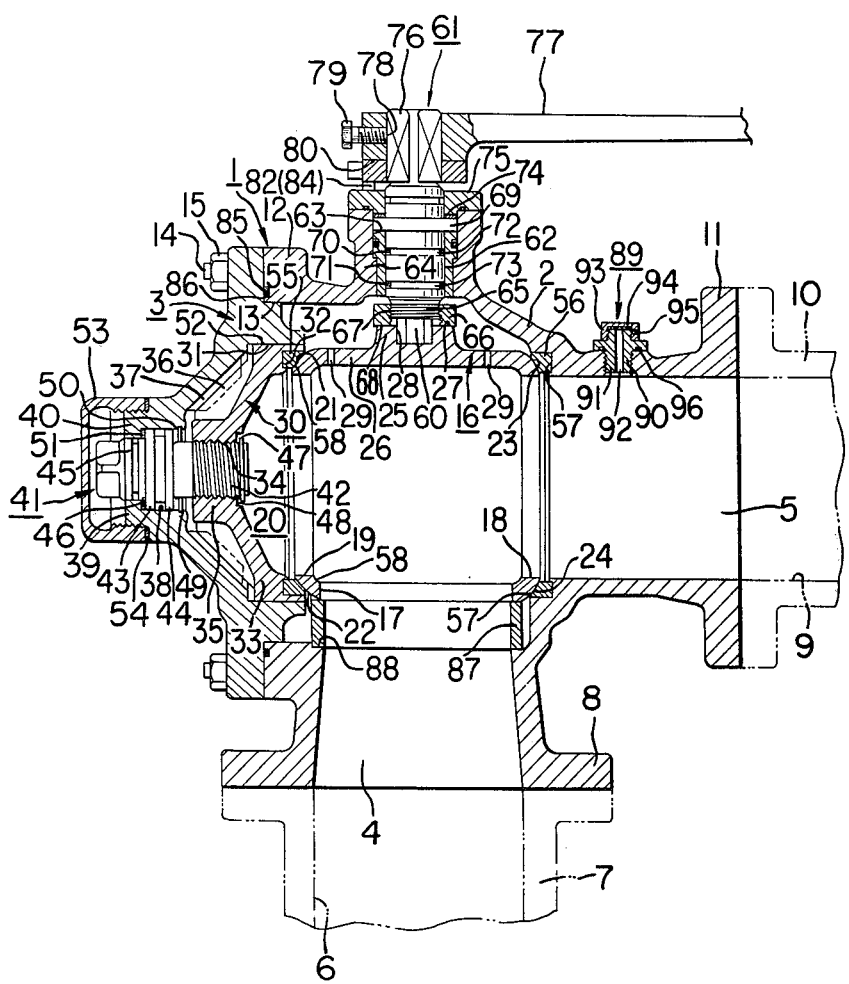
FIG. 1 is a sectional view of the angle ball valve embodying the present invention.

In the angle ball valve according to the present invention, the valve casing 1 comprises a main body 2 and a cover member 3.

The main body 2 has a first flow passage 4 and a second flow passage 5 which are respectively positioned so that they may make a right angle, said first flow passage 4 being communicated with a piping way 6 by connecting a piping 7 to a flange 8 of the main body 2 by means of bolts and nut (not shown), said second flow passage 5 being communicated with a piping way 9 by connecting a piping 10 to a flange 11 of the main body 2 by means of bolts and nuts (not shown).

The cover member 3 is mounted detachably on a mounting portion 12 formed around an opening 13 of the valve casing 1 by means of bolts 14 and nuts 15.

The valve member 16 has an inlet port 17 communicated always with the first flow passage 4; an outlet port 18 communicated with the second flow passage 5; an adjusting port 19 which can smoothly rotate the valve member 16 in such a manner that the pressure in the space 20 formed between the valve member 16 and the inside wall of the valve casing 1 is brought equal to the flow pressure; contacting surfaces 21, 22, 23 and 24 which form respectively a part of the spherical surface having a center to coincide with the center of the valve member 16; a projecting portion 25 formed on the upper wall 26 which faces opposite to the inlet port 17, the upper surface of said projecting portion 25 forming a contacting surface 27, a valve stem fitting hole 28 formed in said projecting portion 25; and communicating ways 29 . . . formed on said upper wall 26.

A seat holder 30 is fitted in the annular step portion 31 of the cover member 3. The seat holder 30 in the form of concave plate is provided with an annular groove 32 at its annular portion 33 and also provided with a female screw hole 34 at its boss portion 35. The rim portion 36 of said seat holder 30 is engaged to the fitting groove 37 of the cover member 3.

The cover member 3 is provided with an adjusting spindle fitting hole 38 and the cap mounting portion 39 at its boss portion 40. An adjusting spindle 41 is engaged to the female screw hole 34 of the seat holder 30 at the male screw portion 42 formed at one end of said adjusting spindle 41.

The flange portions 43 and 44 of the adjusting apindle 41 is engaged to the adjusting spindle fitting hole 38, and another flange portions 45 and 46 engaged to the smaller diameter portion of the adjusting spindle fitting hole 38.

At another end of the adjusting spindle 41 is formed a square portion, which is substantially equal to the square portion of the valve stem.

A snap ring 47 fitted in the adjusting spindle 41 is engageable to the engaging face 48 of the seat holder 30. There exists an adjusting clearance in between the snap ring 47 and the adjusting face 48.

Another snap ring 49 is fitted in the adjusting spindle fitting hole 38, and the washer 50 is inserted into between the flange portion 44 of the adjusting spindle 41 and the snap ring 49.

A thrust ring 51 is inserted into between the flange portion 43 of the adjusting spindle 41 and the step portion of the adjusting spindle fitting hole 38. Accordingly, when the adjusting spindle 41 is rotated, the seat holder 30 is moved while the peripheral surface 52 of the seat holder 30 is slided on the annular step portion 31 of the cover member 3. In this case, the adjusting range of the seat holder 30 is determined by the adjusting clearance.

The cap 53 is mounted detachably on the cap mounting portion 39 of the cover member 3 through the gasket 54.

One seat ring 55 made of synthetic resin is fitted in the annular groove 32 of said seat holder 30. Another seat ring 56 made of synthetic resin is fitted in the annular groove 57 of the main body 2. The valve member 16 is supported by seat rings 55 and 56 in such a manner that contacting surfaces 21 and 22 which contact respectively the supporting surfaces 58 of the seat ring 55 and that contacting surfaces 23 and 24 which contact respectively the supporting surfaces 59 of the seat ring 56.

A fitting portion 60 of the valve stem 61 is fitted in the valve stem fitting hole 28, the sectional view of each of said valve stem fitting hole 28 and said fitting portion 60 having a shape of incomplete circle in which two opposing segments are cut off.

The valve stem 61 is inserted in the bushing 62 fitted in the mounting hole 63 of the mounting portion 64 which is provided on the main body 2. On the lower portion of the valve stem 61 is formed a male screw portion 65, which mounts a receiving member 66 by means of the female screw portion 67 of said receiving member 66.

The receiving surface 68 formed on the lower surface of said receiving member 66 is in contact with the contacting surface 27 of the valve member 16. The lower surface of the annular portion 69 of the valve stem 61 is in contact with the upper surface of the bushing 62, and O-ring 70 and 71 are fitted respectively in the peripheral grooves 72 and 73. A thrust ring 74 is placed on the upper surface of the annular portion 69 of the valve stem 61. A mounting cover 75 is mounted on said thrust ring 74 and on the upper surface of the mounting portion 64 respectively.

On the square head portion 76 formed at the upper portion of the valve stem 61 is mounted the hand lever 77 in such a manner that said square head portion 76 is inserted into the mounting hole 78 of said hand lever 77 and then said hand lever 77 is fixed with a bolt 79. A set member 80 is mounted on the square head portion 76 so that the upper surface of said set member 80 may contact the lower surface of the boss of said hand lever 77.

The closing side engaging face 81 of the set member 80 is engageable to the stopper pin 82 on the mounting cover 75, and the opening side engaging face 83 of the set member 80 is engageable to the stopper pin 84 on the mounting cover 75.

The fitting groove 85 is formed on the mounting portion 12 of the main body 2, and O-ring 86 is fitted in said fitting groove 85 in such a manner that it is always pressed by the cover member 3.

A stay ring 87 is fitted in the placing step 88 of the main body 2, and the lower surface of the valve member 16 is supported by the upper surface of said stay ring 87.

The detecting means 89 is provided on the upper wall around the second flow passage 5 of the main body 2 and comprises a plug 90 which is fitted in the screw hole 91 of the main body 2 and which has a longitudinal hole 92 opened in the second flow passage 5 at its lower port; a plug cap 93 mounted on the plug 90 through the gasket 94 placed on the upper surface of the plug 90, said plug cap 93 being provided with a horizontal hole 95 on its side wall. In FIG. 1, the numeral 96 shows respectively O-rings.

In the angle ball valve constructed as mentioned above, in the case when the fluid introduced into the valve member 16 from the first flow passage 4 through the inlet port 17 flows out of the angle ball valve through the outlet port 18 and the second flow passage 5, a partial load is caused in the valve member 16 by the fluid and then received by the receiving member 66 through the receiving surface 68 without being received by the seat rings 55 and 56. In this case, it is possible to adjust the contacting state between the receiving surface of the receiving member 66 and the contacting surface 27 of the valve member 16 by the adjusting movement of the receiving member 66.

The rotation of the valve member 16 can be made by the hand lever 77, and only when the outlet port 18 of the valve member 16 is coincided with the second flow passage 5, the valve comes to the opened state.

Accordingly, the partial load of the fluid introduced into the valve member 16 from the first flow passage 4 and the inlet port 17 along the axial line of the valve stem 61 is received by the receiving member 66. In other words, the seat rings 55 and 56 do not receive said partial load and consequently is prevented from its deformation and ununiform wear. Therefore, the posture of the valve member 16 can be always kept in the normal state.

In the case when the valve member 16 and the seat rings 55, 56 have worn uniformly and thereby the relative position between the valve member 16 and the valve stem 61 come to the loosened state, it is possible to compensate such a loosened state by the mere adjustment of the receiving member 16.

Further, as the pressure in the inside and the outside of the valve member 16 becomes equal by means of the adjusting port 19 and the communicating ways 29, 29 of the valve member 16, the rotation of the valve member 16 is always kept smooth.

Also, the static electricity generated between the valve member 16 and the seat rings 55, 56 is earthed through the stay ring 87, so that any danger to be caused by the static electricity can be avoided.

It is easily possible to check up each member of the inside of the main body 2 and also to exchange all of the parts by taking off the cover member 3.

In the case when the valve is in the closed state, the leakage of the fluid in the second flow passage 5 can be detected by the detecting means, which can be done in such a manner that the plug cap 73 is moved upwardly, and the leaked fluid is made to escape out of the valve through the longitudinal hole 92 and the horizontal hole 95, when a warning sound is generated.

In the case that the seat rings 55 and 56 are worn and as a result the leakage of fluid is caused, it is possible to stop such leakage and compensate the wearing of the seat rings by the simple operation such that the cap 53 is taken off from the capmounting portion 39 of the cover member 3; the adjusting spindle 41 is rotated by using the hand tool at its square head; thereby the seat holder 30 is moved inwardly; and consequently the seat rings 55 and 56 come to closely contact the valve number 16.

This invention can be also applied to the angle ball valve in which the first flow passage has an oblique relationship to the second flow passage.

What is claimed is:

1. An angle ball valve characterized by comprising a valve casing which consists of a main body and a cover member mounted detachably to said main body which has a first flow passage and a second flow passage, each passage being positioned in an angle state, said cover member having a seat holder fitted slidably in its seat holder fitting hole and an adjusting spindle fitting hole at its boss portion, said seat holder having a female screw hole at its boss portion, a valve member which is provided within the valve casing and which has an inlet port communicated always with the first flow passage, an outlet port capable of communicating with the second flow passage, a valve stem fitting hole, and a contacting surface provided around said valve fitting hole; seat rings fitted in the valve casing to support the valve member, one seat ring being fitted in the main body, and another seat ring being fitted in the seat holder; a valve stem arranged at the opposite side to the first flow passage and fitted in the valve stem fitting hole of the valve member at its lower portion, said valve stem being able to rotate the valve member along the axis of the first flow passage; a receiving member mounted on the valve stem which is adjustably and movably engaged with the contacting surface of the valve member at its lower end surface so that the receiving member may receive a partial load to be applied on the valve member; and an adjusting spindle engaged in the female screw hole of the seat holder in its male screw portion and also fitted in the adjusting spindle fitting hole of the cover member so as to rotate merely without moving in the axial direction, whereby it is possible to compensate the contacting state between the seat rings and the valve member by the adjusting movement of the seat holder through the rotation of the adjusting spindle.

* * * * *